United States Patent
Lee et al.

(10) Patent No.: US 9,898,053 B2
(45) Date of Patent: Feb. 20, 2018

(54) ELECTRODE MEMBER AND TOUCH PANEL INCLUDING THE SAME

(71) Applicant: LG INNOTEK CO., LTD., Seoul (KR)

(72) Inventors: Young Jae Lee, Seoul (KR); Hyun Soo Kim, Seoul (KR); Jung Hwan Bang, Seoul (KR); Jun Sik Shin, Seoul (KR); Joon Hyuk Yang, Seoul (KR); Dong Mug Seong, Seoul (KR); Jun Phill Eom, Seoul (KR); Kyoung Jong Yoo, Seoul (KR); Jun Lee, Seoul (KR); Chan Kyu Koo, Seoul (KR)

(73) Assignee: LG INNOTEK CO., LTD., Seoul (KR)

( * ) Notice: Subject to any disclaimer, the term of this patent is extended or adjusted under 35 U.S.C. 154(b) by 0 days.

(21) Appl. No.: 14/095,490

(22) Filed: Dec. 3, 2013

(65) Prior Publication Data

US 2014/0152917 A1   Jun. 5, 2014

(30) Foreign Application Priority Data

Dec. 3, 2012  (KR) .................. 10-2012-0138871
Jul. 15, 2013  (KR) .................. 10-2013-0083148

(51) Int. Cl.
*G06F 3/041*   (2006.01)
*G06F 3/044*   (2006.01)
*G06F 1/16*    (2006.01)

(52) U.S. Cl.
CPC ............ *G06F 1/1692* (2013.01); *G06F 3/044* (2013.01); *G06F 2203/04103* (2013.01); *G06F 2203/04112* (2013.01)

(58) Field of Classification Search
CPC .. G06F 3/044; G06F 3/04112; G06F 3/04103; G06F 2203/04112; G06F 2203/04103
USPC ................................................ 345/173–174
See application file for complete search history.

(56) References Cited

U.S. PATENT DOCUMENTS

| 8,872,039 B2 | 10/2014 | Kajiya |
| 2009/0135161 A1* | 5/2009 | Endo .............................. 345/174 |
| 2011/0227858 A1* | 9/2011 | An et al. ....................... 345/174 |
| 2011/0316803 A1 | 12/2011 | Kim |

(Continued)

FOREIGN PATENT DOCUMENTS

| CN | 102541368 A | 7/2012 |
| JP | 61-184626 A | 8/1986 |

(Continued)

OTHER PUBLICATIONS

Office Action dated Mar. 16, 2016 in Chinese Application No. 201310641695.7.

(Continued)

*Primary Examiner* — Kwin Xie
(74) *Attorney, Agent, or Firm* — Saliwanchik, Lloyd & Eisenschenk

(57) ABSTRACT

Disclosed is a touch panel. The touch panel includes a substrate, and an electrode part formed in a mesh shape on the substrate. The electrode part includes a resin layer comprising first and second sub-patterns, and a transparent electrode on the first sub-pattern. A ratio of a width of the first sub-pattern to a width of the second sub-pattern is in a range of 1:0.01 to 1:0.5.

20 Claims, 10 Drawing Sheets

(56) References Cited

U.S. PATENT DOCUMENTS

| | | |
|---|---|---|
| 2012/0038584 A1 | 2/2012 | Liu |
| 2012/0262385 A1* | 10/2012 | Kim .................. G06F 3/044 345/173 |
| 2012/0268402 A1* | 10/2012 | Wang ................. G06F 3/041 345/173 |
| 2012/0319978 A1* | 12/2012 | Takeuchi .......... G02F 1/13338 345/173 |
| 2012/0327021 A1 | 12/2012 | Ryu et al. |
| 2013/0068603 A1 | 3/2013 | Kwak |
| 2013/0242485 A1 | 9/2013 | Ohtani et al. |
| 2013/0299216 A1 | 11/2013 | Ichiki |
| 2014/0063374 A1 | 3/2014 | Kuriki |
| 2014/0063375 A1 | 3/2014 | Kuriki |

FOREIGN PATENT DOCUMENTS

| | | |
|---|---|---|
| JP | 2009-259003 A | 5/2009 |
| JP | 2012-204170 A | 10/2012 |
| TW | 201203064 A | 1/2012 |
| TW | 201229853 A | 7/2012 |
| TW | 201248484 A | 12/2012 |
| WO | WO-2011108869 A2 | 9/2011 |
| WO | WO-2011/149199 A2 | 12/2011 |
| WO | WO-2012098992 A1 | 7/2012 |
| WO | WO-2012157555 A1 | 11/2012 |
| WO | WO-2012157556 A1 | 11/2012 |

OTHER PUBLICATIONS

European Search Report dated May 2, 2016 in European Application No. 13195557.7.
Office Action dated May 5, 2017 in Taiwanese Application No. 102144172.
Office Action dated Aug. 31, 2017 in Japanese Application No. 2013-250363.

* cited by examiner

ELECTRODE MEMBER AND TOUCH PANEL INCLUDING THE SAME

CROSS-REFERENCE TO RELATED APPLICATIONS

This application claims the benefit under 35 U.S.C. §119 of Korean Patent Application Nos. 10-2012-0138871, filed Dec. 3, 2012, and 10-2013-0083148, filed Jul. 15, 2013, which are hereby incorporated by reference in their entirety.

BACKGROUND

The embodiment relates to an electrode member and a touch panel including the same.

Recently, a touch panel, which performs an input function through the touch of an image displayed on a display device by an input device such as a stylus pen or a finger, has been applied to various electronic appliances The touch panel may be mainly classified into a resistive touch panel and a capacitive touch panel. In the resistive touch panel, glass is shorted with an electrode due to the pressure of the input device so that a touch point is detected. In the capacitive touch panel, the variation in capacitance between electrodes is detected when a finger of the user is touched on the capacitive touch panel, so that the touch point is detected.

In the resistive type touch panel, the repeated use thereof may degrade the performance thereof, and cause scratches. Accordingly, the interest on the capacitive type touch panel representing superior endurance and having a long lifespan is increased.

Meanwhile, although indium tin oxide (ITO) has been most extensively used for an electrode of the touch panel, ITO has a limitation in the realization of low-resistance required for a large-area touch panel. Therefore, recently, a transparent electrode based on a mesh-shape metal thin film has been spotlighted.

Accordingly, studies and research has been conducted on materials to be substituted for ITO, and, recently, various materials such as carbon nanotube (CNT), Ag nanowire, and graphene have been developed.

A conventional metal mesh scheme is to form a mesh-shape metal pattern through a printing scheme using metal ink. The metal mesh scheme is disclosed in Korean Unexamined Publication No. 10-2012-0018059.

However, in the case of the metal mesh formed through the conventional printing scheme, the realization of a fine pattern is difficult. In other words, according to the printing scheme, the minimum line width may be limited in the range of about 3 μm to about 5 μm. The permeability of the metal mesh fabricated in the above scheme is degraded, and the metal lines are viewed, so that a problem occurs in visibility.

Meanwhile, in the conventional touch panel, a transparent electrode pattern has been formed through a photoresist scheme. In other words, after depositing a transparent electrode material and a metal material on a substrate, exposure, development, and etching processes are performed to form the wire electrode pattern and the sensing electrode pattern.

However, when the wire electrode pattern and the sensing electrode pattern are formed in the above scheme, the number of processes is increased, and the processes are complex, so that the process efficiency may be reduced.

In order to solve the above problem, recently, the transparent electrode using the metal thin film mesh has been spotlighted. However, even if the transparent electrode pattern is formed by using the metal thin film mesh, since the photoresist scheme must be used in order to form the wire electrode pattern, the efficiency in the fabricating process may be lowered.

BRIEF SUMMARY

The embodiment provides an electrode member representing improved reliability and a touch panel including the same.

According to the embodiment, there is provided a touch panel. The touch panel includes a substrate, and an electrode part formed in a mesh shape on the substrate. The electrode part includes a resin layer comprising first and second sub-patterns, and a transparent electrode on the first sub-pattern. The ratio of a width of the first sub-pattern to a width of the second sub-pattern is in a range of 1:0.01 to 1:0.5.

As described above, according to the touch panel and the method of fabricating the same, in order to realize the transparent electrode having the line width of about 500 nm to about 3 μm, the ratio of the first sub-pattern, in which the transparent electrode material is formed, to the second sub-pattern formed between the first sub-patterns in width and height is limited to a predetermined ratio.

In other words, when realizing the transparent electrode having the fine line width of about 3 μm or less by limiting the ratio of the first sub-pattern to the second sub-pattern in width and height into the predetermined range, the transparent electrode material remains only in the first sub-pattern, and the transparent electrode material can be completely removed from the upper portion of the second sub-pattern.

Therefore, according to the touch panel according to the embodiment, the transparent electrode having the line width of 3 μm or less can be realized, so that the transmittance can be improved, and the visibility can be improved. In addition, according to the method of fabricating the touch panel of the embodiment, the touch panel having the above effects can be fabricated.

In addition, in the electrode member according to the embodiment, a plurality of patterns are formed between the sensing electrode pattern and the wire electrode pattern while representing the width narrower than the width of the sensing electrode pattern or the wire electrode pattern. Therefore, after depositing the same electrode material on the sensing electrode pattern and the wire electrode pattern, an etching process is performed at a time, thereby simplifying the processes of forming the wire electrode and the sensing electrode.

According to the related art, after sequentially depositing the sensing electrode material and the wire electrode material on the substrate, the photoresist process, in detail, exposure, development, and etching processes are formed to form the wire electrode pattern area and the sensing electrode pattern area, respectively. Therefore, as the number of processes is increased, the process efficiency may be lowered.

Therefore, in the electrode member according to the embodiment, after forming the first to fourth patterns on the substrate through the imprinting process, the same electrode material is deposited on the first and third patterns and an etching process is performed with respect to the resultant structure at a time, so that the sensing electrode pattern and the wire electrode pattern can be formed.

Accordingly, in the electrode member according to the embodiment, a nano-pattern is formed even in a part in which the wire electrode is formed, thereby fabricating the sensing electrode pattern and the wire electrode pattern including the same electrode material.

In addition, the fabricating process efficiency of the touch panel having the electrode member applied thereto can be improved.

DETAILED DESCRIPTION

Figure 1:
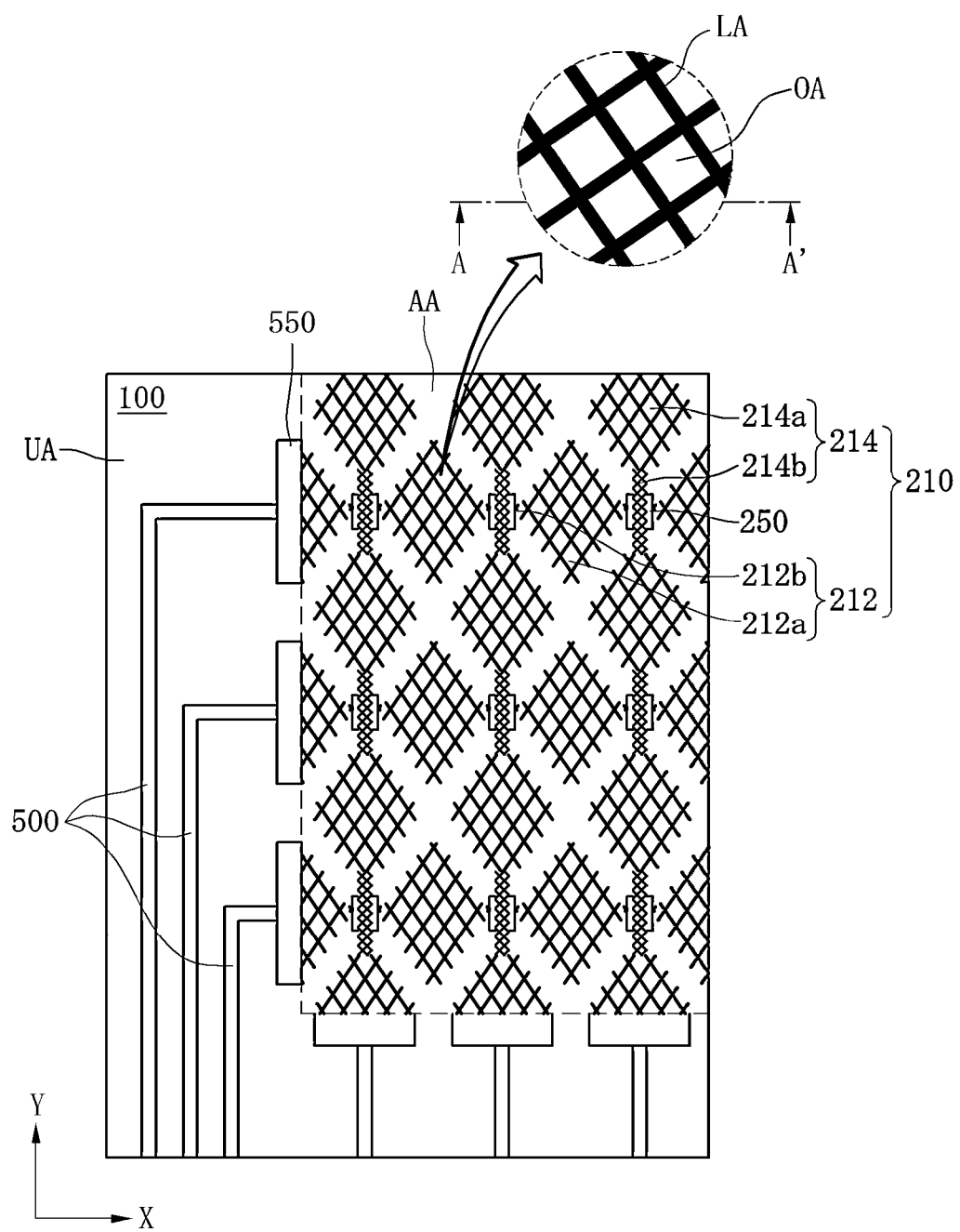
FIG. 1 is a plan view schematically showing the touch panel according to the embodiment.

In the description of the embodiments, it will be understood that, when a layer (or film), a region, a pattern, or a structure is referred to as being "on" or "under" another substrate, another layer (or film), another region, another pad, or another pattern, it can be "directly" or "indirectly" over the other substrate, layer (or film), region, pad, or pattern, or one or more intervening layers may also be present. Such a position of the layer has been described with reference to the drawings.

The thickness and size of each layer (or film), each region, each pattern, or each structure shown in the drawings may be exaggerated, omitted or schematically drawn for the purpose of convenience or clarity. In addition, the size of the layer (or film), the region, the pattern, or the structure does not utterly reflect an actual size.

Hereinafter, the embodiment will be described in detail with reference to accompanying drawings.

Figure 2:
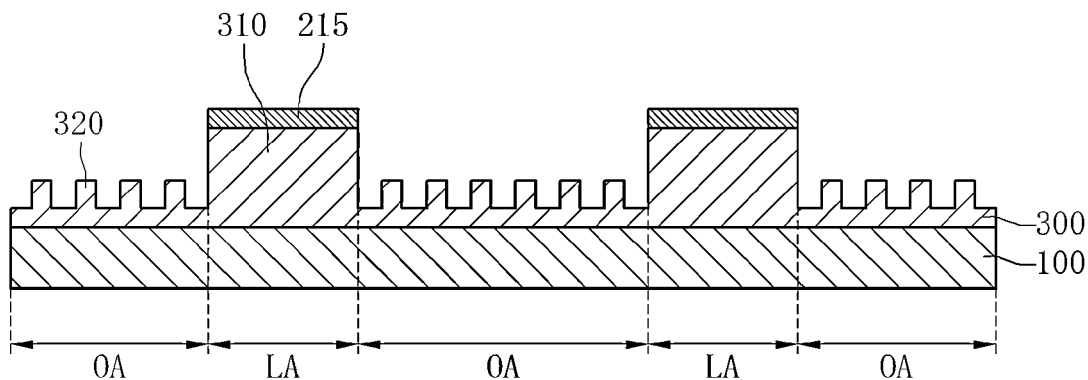
FIG. 2 is a sectional view taken along line A-A' of FIG. 1.

Hereinafter, a touch panel according to the embodiment will be described with reference to FIGS. 1 to 3. FIG. 1 is a plan view schematically showing the touch panel according to the embodiment. FIG. 2 is a sectional view taken along line A-A' of FIG. 1, and FIG. 3 is a sectional view taken along line A-A' of FIG. 1.

Figure 3:
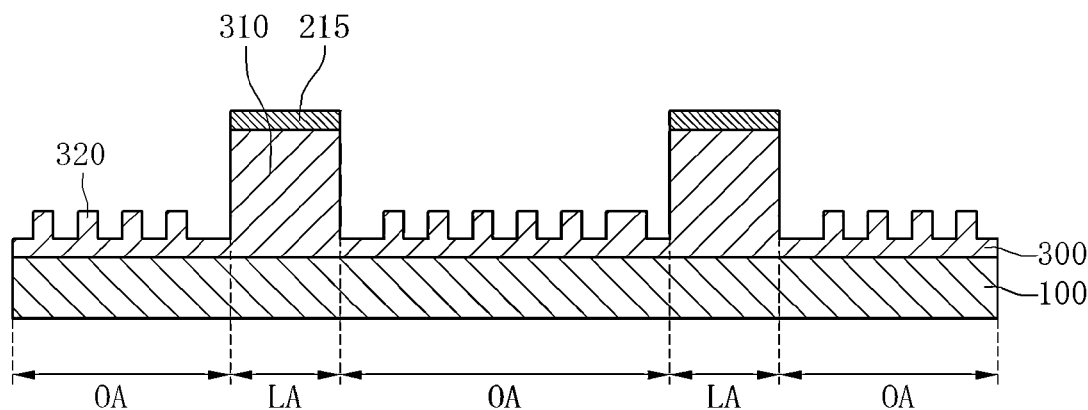
FIG. 3 is a sectional view taken along line A-A' of FIG. 1.

Referring to FIGS. 1 to 3, the touch panel according to the embodiment includes a substrate 100 defined therein with an active area AA, in which the position of an input device (e.g., a finger) is sensed, and an unactive area UA provided around the active area AA.

In this case, an electrode part 210 may be formed in the active area AA to sense the input device. In addition, a wire 500 may be formed in the unactive area UA to electrically connect the electrode part 210. In addition, a wire connection part 550 may be provided between the wire 500 and the electrode part 210. Further, an external circuit connected with the wire 500 may be located in the unactive area UA. The unactive area UA may be provided therein with an outer dummy layer. A logo may be formed in the outer dummy layer.

If the input device such as the finger is touched on the above touch panel, the variation of a capacitance occurs in the touched part of the input device on the touch panel. The part of the touch panel, in which the variation of the capacitance occurs, may be detected a touch point.

Hereinafter, the above touch panel will be described in more detail.

The substrate 100 may include various materials to support the electrode part 210, the wire 500, and the circuit substrate that are formed on the substrate 100. For example, the substrate 100 may include a glass substrate or a plastic substrate.

The outer dummy layer is formed in the unactive area UA of the substrate 100. The outer dummy layer may be coated with a material having a predetermined color so that the wire 500 and the printed circuit pattern to connect the wire 500 with the external circuit are not viewed at the outside. The outer dummy layer may have a color appropriate to a required outer appearance. For example, the outer dummy layer may include black pigments to represent a black color. A required logo may be formed in the outer dummy layer through various schemes. The outer dummy layer may be formed through a deposition scheme, a printing scheme, and a wet coating scheme.

The electrode part 210 may be formed on the substrate 100. The transparent electrode 210 may sense the touch of the input device such as a finger.

Referring to FIG. 1, the electrode part 210 includes a first electrode 212 and a second electrode 214.

The first electrode 212 includes a plurality of first sensor parts 212a to sense the touch of the input device such as the finger and a first connection electrode part 212b to connect the first sensor parts 212a with each other. The first connection electrode part 212b connects the first sensor parts 212a with each other in a first direction (X axis direction of drawings), so that the first electrode 212 may extend in the first direction.

Similarly, the second electrode 214 includes a plurality of second sensor parts 214a to sense the touch of the input device such as a finger and a second connection electrode part 214b to connect the second sensor parts 214a with each other. The second connection electrode part 214b connects the second sensor parts 214a with each other in a second direction (Y axis direction of drawings) crossing the first direction, so that the second electrode 214 may extend in the second direction.

An insulating layer 250 may be interposed between the first connection electrode part 212b and the second connection electrode part 214b to inhibit the first connection electrode part 212b from being shorted with respect to the second connection electrode part 214b. The insulating layer 250 may include a transparent insulating material to insulate the first electrode 212 from the second electrode 214.

Meanwhile, the electrode part 210 is provided in the shape of a mesh. In detail, the electrode part 210 includes a mesh opening part OA and a mesh line part LA. In this case, the line width of the mesh line part LA may be about 3 μm or less. Preferably, when the line width of the mesh line part LA is 3 μm or less, the pattern of the electrode part 210 may not be viewed. Preferably, the line width of the mesh line part LA may be in the range of 500 nm to 3 µm.

In addition, as shown in FIG. 1, the mesh opening part OA may have a rectangular shape, but the embodiment is not limited thereto. In other words, the mesh opening part OA may have various shapes such as a diamond shape, a polygonal shape such as a pentagonal shape or a hexagonal shape, and a circular shape.

The electrode part 210 is provided in the mesh shape, so that the pattern of the electrode part 210 is not viewed when viewed on the active area AA. In other words, even if the electrode part 210 is formed of metal, the pattern of the electrode part 210 may be not viewed. In addition, even if the electrode part 210 is applied to a large-size touch panel, the resistance of the touch panel may be reduced. In addition, when the electrode part 210 is formed through a printing process, the printing quality is improved, so that the high-quality touch panel can be ensured.

Referring to FIGS. 2 and 3, the electrode part 210 includes a resin layer 300 and an electrode material 215.

The resin layer 300 is provided therein with a first sub-pattern 310 and a second sub-pattern 320. The first and second sub-patterns 310 and 320 directly make contact with the resin layer 300. The first sub-pattern 310 is provided in the mesh line part LA. Accordingly, the first sub-pattern 310 is provided in the mesh shape. In addition, the second sub-pattern 320 is provided in the mesh opening part OA. Therefore, the second sub-pattern 320 may be provided between first sub-patterns 310.

The first sub-pattern 310 may have a width and a height different from a width and a height of the second sub-pattern 320, respectively. The width and the height of the first-sub pattern 310 may be formed in the unit of micro-meter µm or a nano-meter nm. In addition, the width and the height of the second sub-pattern 320 may be formed in the unit of nano-meter nm. For example, the width of the first sub-pattern 310 may be in the range of 500 nm to 3 µm, and the width of the second sub-pattern 320 may be in the range of 100 nm to 500 nm.

The first sub-pattern 310 may be formed at a predetermined ratio with respect to the second sub-pattern 320, respectively, in width and height.

In detail, the ratio of the width of the first sub-pattern 310 to the width of the second sub-pattern 320 may be in the range of about 1:0.01 to about 1:0.5.

In addition, the ratio of the width of the first sub-pattern 310 to the height of the first sub-pattern 310 may be in the range of about 1:0.1 to about 1:1. Further, the ratio of the width of the first sub-pattern 310 to the width of the first sub-pattern 310 may be in the range of about 0.1:1 to about 1:1. In other words, as shown in FIGS. 2 and 3, one sectional surface of the first sub-pattern 310 may have a rectangular shape or a square shape.

In addition, the ratio of the height of the first sub-pattern 310 to the height of the second sub-pattern 320 may be in the range of about 1:0.1 to about 1:0.9.

The above ratio of the first sub-pattern 310 to the second sub-pattern 320 in width and height is set by taking into consideration the optimal ratio to form a transparent electrode having a fine line width when the transparent electrode is formed on the first sub-pattern 310. In other words, the ratio of the first sub-pattern 310 to the second sub-pattern 320 in width and height is set in the above numeric range, so that the transparent electrode may be formed in the mesh shape having the fine line width of about 3 µm or less.

In other words, the transparent electrode is formed on the resin layer 300, in detail, formed on the top surface of the first sub-pattern 310 of the resin layer 300. In this case, an electrode material 215 is formed in the resin layer 300 and subject to an etching process.

In this case, in order to form an electrode having a fine line width of 3 µm or less, the ratio of the first sub-pattern 310 to the second sub-pattern 320 in width and height may be an important parameter. In other words, if the ratio of the first sub-pattern 310 to the second sub-pattern 320 in width and height is beyond the set ratio range, the electrode material 215 formed on the second sub-pattern 320 may be not completely etched, or the electrode material 215 formed on the first sub-pattern 310 may be etched, so that the line width of about 3 µm or less may not be realized.

Therefore, according to the touch panel of the embodiment, the ratio of the first sub-pattern 310 to the second sub-pattern 320 formed in the resin layer 300 in width and height is limited into a predetermined range, so that the fine line width of about 500 nm to about 3 µm or less may be formed.

The first sub-pattern 310 and the second sub-pattern 320 may have an intaglio shape or an embossed shape. In detail, when the resin layer 300 is formed in the shape of a flat surface, the first sub-pattern 310 may have an embossed shape protruding upward from the resin layer 300, or may have an intaglio shape recessed downward from the resin layer 300.

The electrode material 215 may include a printable metal paste material. In detail, the electrode material 215 may include at least one selected from the group consisting of copper (Cu), aluminum (Al), nickel (Ni), tin (Sn), zinc (Zn), gold (Au), silver (Ag), and the alloy thereof. Accordingly, a mesh having a fine line width is formed of a metal paste, so that indium tin oxide (ITO) may be substituted with the above material. Accordingly, the electrode material 215 is advantageous in terms of a price. The electrode material 215 may be formed through a simple deposition process or a simple printing process.

Hereinafter, a method of fabricating the touch panel according to the embodiment will be described with reference to FIGS. 4 to 12. The method of fabricating the touch panel will be described by making reference to the above description of the touch panel. In other words, the description of the method of fabricating the touch panel is incorporated in the above description of the touch panel.

Figure 4:
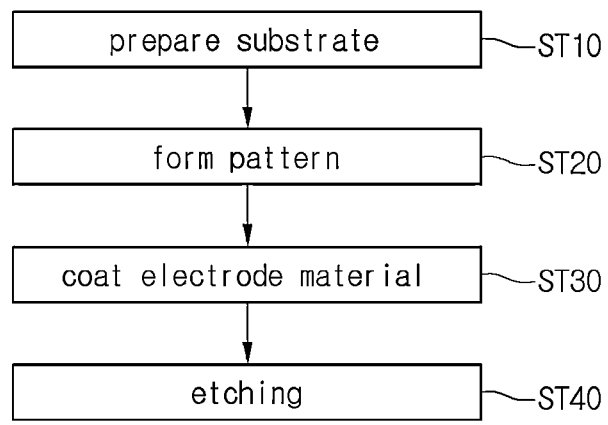
FIG. 4 is a flowchart showing a method of fabricating a touch panel according to the embodiment.
Figure 5:
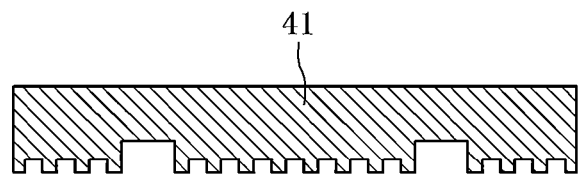
FIGS. 5 to 12 are sectional views showing the method of fabricating the touch panel according to the embodiment.
Figure 6:
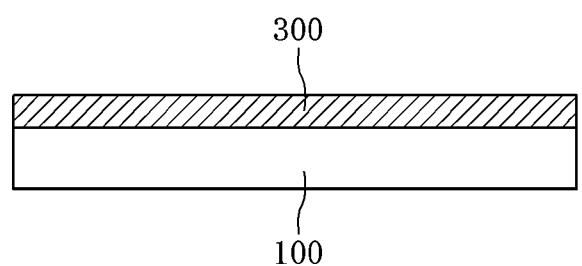
Figure 7:
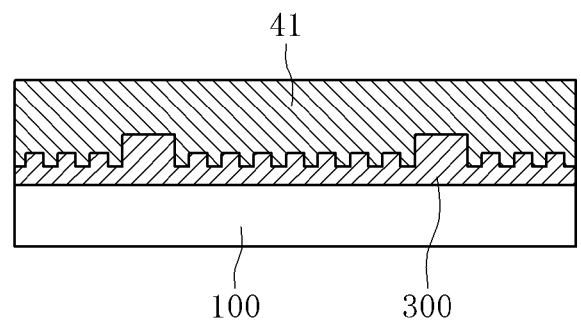
Figure 8:
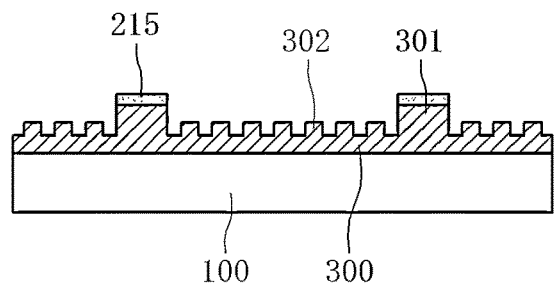
Figure 9:
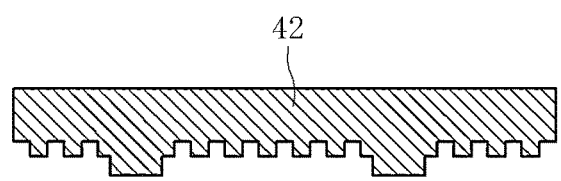
Figure 9:
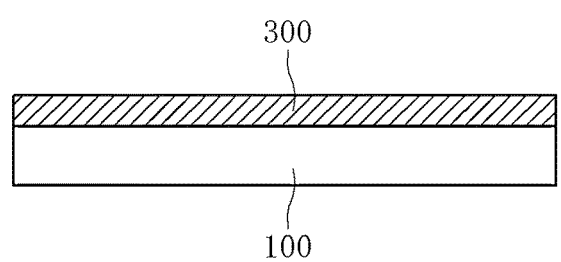
Figure 10:
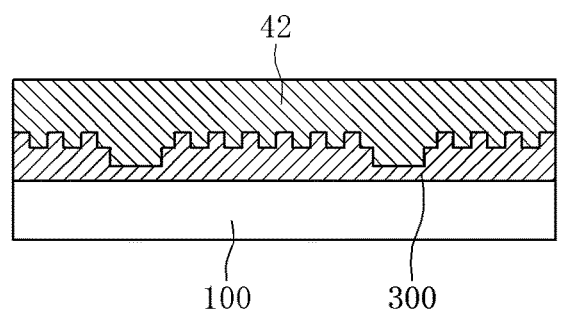
Figure 11:
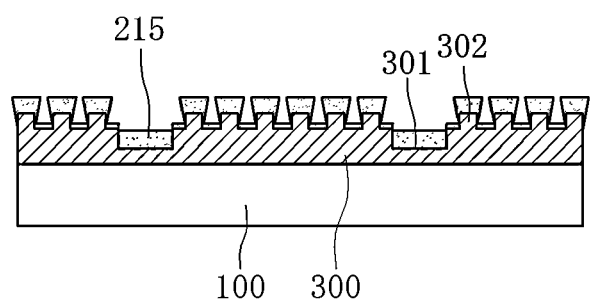
Figure 12:
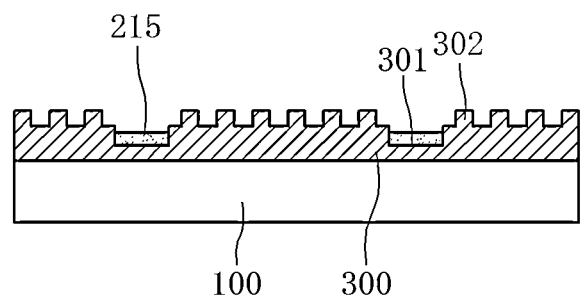

FIG. 4 is a flowchart showing a method of fabricating a touch panel according to the embodiment. FIGS. 5 to 12 are sectional views showing the method of fabricating the touch panel according to the embodiment.

Referring to FIG. 4, according to the method of fabricating the touch panel of the embodiment includes a step (ST10) of preparing the substrate 100, a step (ST20) of forming a pattern, a step (ST30) of forming the electrode material 215, and a step (ST40) of performing an etching process.

In the step (ST10) of preparing the substrate 100, a glass substrate or a plastic substrate is prepared. The substrate 100 may be divided into the active area AA and an unactive area UA. The unactive area UA may be coated with a material representing, for example, a black color, so that a logo can be formed on the unactive area UA.

Subsequently, in the step (ST20) of forming the pattern, after forming the resin layer 300 on the substrate 100, the first and second sub-patterns 310 and 320 are formed on the resin layer 300.

As shown in FIGS. 5, 6, 9, and 10, the first and second sub-patterns 310 and 320 may be formed by using embossed and intaglio molds 41 and 42. In detail, after forming the resin layer 300 on the substrate 100, the resin layer 300 is imprinted by using the embossed mold 41 or the intaglio mold 42, so that the first and second sub-patterns 310 and 320 may be formed.

In other words, when the first sub-pattern 310 is formed in the intaglio shape, the first sub-pattern 310 having the intaglio shape is formed on the resin layer 300 by using the embossed mold 41 corresponding to the intaglio shape. When the first sub-pattern 310 is formed in the embossed shape, the first sub-pattern 310 having the embossed shape may be formed on the resin layer 300 by using the intaglio mold 42 corresponding to the embossed shape. In this case, the resin layer 300 may include UV resin or thermosetting resin.

In this case, the shapes of the first sub-pattern 310 and the second sub-pattern 320, and the ratio of the first sub-pattern 310 to the second sub-pattern 320 in width and height are incorporated in the above-described width and height ratios in the touch panel.

Thereafter, in the step (ST30) of forming the electrode material 215, the electrode material 215 is formed on the resin layer 300. In other words, the electrode material 215 may be coated and deposited on the top surface and/or the lateral side of the first and second sub-patterns 310 and 320 formed on the resin layer.

The electrode material 215 may be include at least one selected from the group consisting of copper (Cu), aluminum (Al), nickel (Ni), tin (Sn), zinc (Zn), gold (Au), silver (Ag) and the alloy thereof.

Thereafter, in the step (ST40) of performing the etching process, the electrode material 215 is partially etched on the resin layer 300.

A difference is made in an etching rate depending on the structure of the first and second sub-patterns 310 and 320 formed on the resin layer 300 and the contact area with the electrode material 215. In other words, since the contact area between the first sub-pattern 310 and the electrode material 215 is wider than the contact area between the second sub-pattern 320 and the electrode material 215, the etching for the electrode material 215 formed on the first sub-pattern 310 may be less performed. In other words, as the etching process is performed at the same etching rate, the electrode material 215 remains on the first sub-pattern 310, and the electrode material 215 is etched and removed from the upper portion of the second sub-pattern 320. Therefore, referring to FIGS. 8 and 12, a transparent electrode may be formed only on the first sub-pattern 310. The transparent electrode may be formed in the mesh shape which is the same as that of the first sub-pattern 310.

As described above, according to the touch panel and the method of fabricating the touch panel of the embodiment, in order to realize the transparent electrode having a fine line width, in detail, the fine line width of about 500 nm to about 3 μm, the ratio of the first sub-pattern having the transparent electrode material deposited thereon to the second sub-pattern formed between the first sub-patterns in width and height is limited into a predetermined range.

In other words, when the ratio of the first sub-pattern to the second sub-pattern in width and height is limited into a predetermined range, so that the transparent electrode having the fine line width of about 3 μm or less is realized, the transparent electrode material can remain only on the first sub-pattern, and be completely removed from the second sub-pattern in the etching process.

Therefore, since the transparent electrode can be realized with the fine line width of about 3 μm or less in the touch panel according to the embodiment, the transmittance and the visibility can be improved. In addition, according to the method of fabricating the touch panel of the embodiment, the touch panel having the above effect can be fabricated.

Meanwhile, referring to FIGS. 13 to 16, an electrode member according to another embodiment includes a substrate 100, a sensing electrode 200, and a wire electrode 500.

The substrate 100 may include plastic or glass. In addition, the substrate 100 includes an active area AA, in which the position of the input device (e.g., finger) is sensed, and an unactive area UA provided around the active area AA.

In this case, the sensing electrode 200 may be formed in the active area AA to sense the input device. In addition, the wire electrode 500 may be formed in the unactive area UA to electrically connect the sensing electrode 200. Further, an external circuit connected with the wire electrode 500 may be located in the unactive area UA. In addition, a printing layer (not shown) may be formed in the unactive area UA, and a logo or a command icon pattern part may be formed in the printing layer.

If the input device such as the finger is touched on the above touch panel, the variation of a capacitance occurs in the touched part of the input device on the touch panel. The part of the touch panel, in which the variation of the capacitance occurs, may be detected a touch point.

The sensing electrode 200 is formed on the active area AA of the substrate 100. The sensing electrode 200 may sense the touch of the input device such as the finger.

Figure 13:
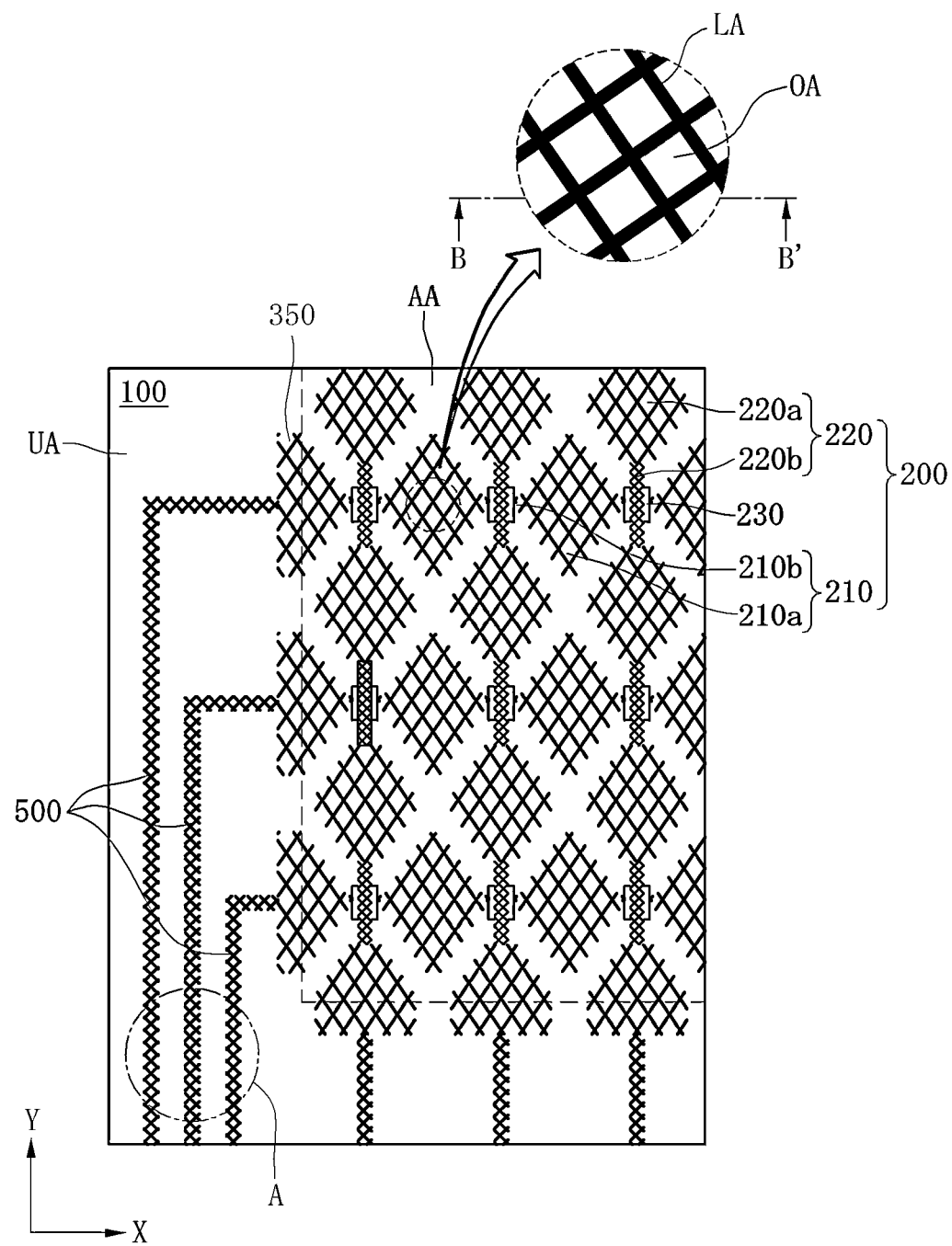
FIG. 13 is a sectional view schematically showing an electrode member according to the embodiment.

Referring to FIG. 13, the sensing electrode 200 includes a first sensing electrode 210 and a second sensing electrode 220.

The first sensing electrode 210 includes a plurality of first sensor parts 210a to sense the touch of the input device such as the finger and a first connection electrode part 210b to connect the first sensor parts 210a with each other. The first connection electrode part 210b connects the first sensor parts 210a with each other in the first direction (X axis direction of drawings), so that the first sensing electrode 210 may extend in the first direction.

Similarly, the second sensing electrode 220 includes a plurality of second sensor parts 220a to sense the touch of the input device such as a finger and a second connection electrode part 220b connecting the second sensor parts 220a with each other. The second connection electrode part 220b connects the second sensor parts 220a in the second direction (Y-axis direction in drawings) crossing the first direction, so that the second sensing electrode 220 may extend in the second direction.

An insulating layer 230 may be interposed between the first connection electrode part 210b and the second connection electrode part 220b to inhibit electric short between the first and second connection electrode parts 210b and 220b. The insulating layer 230 may include a transparent insulating material to insulate the first sensing electrode 210 from the second sensing electrode 220.

Meanwhile, the first sensing electrode 210 is provided in the shape of a mesh. In detail, the first sensing electrode 210 includes the mesh opening part OA and the mesh line part LA. In this case, the line width of the mesh line part LA may be about 3 μm or less. Preferably, when the line width of the mesh line part LA is 3 μm or less, the pattern of the sensing electrode 200 may not be viewed. Preferably, the line width of the mesh line part LA may be in the range of 500 nm to 3 μm.

In addition, as shown in FIG. 13, the mesh opening part OA may have a rectangular shape, but the embodiment is not limited thereto. In other words, the mesh opening part OA may have various shapes such as a diamond shape, a polygonal shape such as a pentagonal shape or a hexagonal shape, and a circular shape.

The sensing electrode 200 is provided in the mesh shape, so that the pattern of the sensing electrode 200 is not viewed when viewed on the active area AA. In other words, even if the sensing electrode 200 is formed of metal, the pattern of the sensing electrode 200 may be not viewed. In addition, even if the sensing electrode 200 is applied to a large-size touch panel, the resistance of the touch panel may be reduced. In addition, when the sensing electrode 200 is formed through a printing process, the printing quality is improved, so that the high-quality touch panel can be ensured.

The wire electrode 500 is formed on the unactive area UA of the substrate 100. The wire electrode 500 is electrically connected with the sensing electrode 200. Meanwhile, a wire electrode connection part 350 may be further interposed between the wire electrode 500 and the sensing electrode 200. The wire electrode 500 transmits a touch sensing signal sensed by the sensing electrode 200 to a flexible printing circuit board (FPCB). In other words, the wire electrode 500 transmits the touch sensing signal sensed by the sensing electrode 200 to a connector (not shown) mounted on the FPCB.

Hereinafter, the sensing electrode 200 and the wire electrode 500 will be described in detail with reference to FIGS. 14 to 16.

Figure 14:
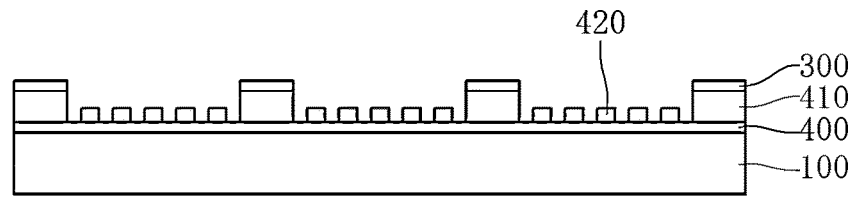
FIG. 14 is an enlarged sectional view of a part A of FIG. 13.

Referring to FIG. 14, a wire electrode part of a wire electrode member includes the substrate 100, a resin layer 400 formed on the substrate 100, first and second patterns 410 and 420 formed on the resin layer 400, and the wire electrode 500 formed on the first pattern 410.

The wire electrode 500 is formed on the unactive area UA of the substrate 100. After forming the resin layer 400 on the unactive area UA, the first and second patterns 410 and 420 may be formed through an imprinting process. The resin layer 400 may include UV resin or thermo-setting resin.

The wire electrode material may be coated on the first pattern 410 to form the wire electrode 500.

The width of the first pattern 410 may be different from the width of the second pattern 420. In detail, the width of the first pattern 410 may be greater than the width of the second pattern 420. For example, the width of the first pattern 410 may be several μm, and the width of the second pattern 420 may be several μm.

The width and the height of the first pattern 410 may be formed at predetermined ratios with respect to the width and the height of the second pattern 420, respectively.

In detail, the ratio of the width of the first pattern 410 to the width of the second pattern 420 may be in the range of about 1:0.01 to about 1:0.5.

In addition, the ratio of the width of the first pattern 410 to the height of the first pattern 410 may be in the range of about 1:0.1 to about 1:1. Further, the ratio of the width of the first pattern 410 to the width of the first pattern 410 may be in the range of about 0.1:1 to about 1:1. In other words, as shown in FIG. 14, one sectional surface of the first pattern 410 may have a rectangular shape or a square shape.

In addition, the height of the first pattern 410 to the height of the second pattern 420 may be in the range of about 1:0.1 to about 1:0.9.

Figure 15:
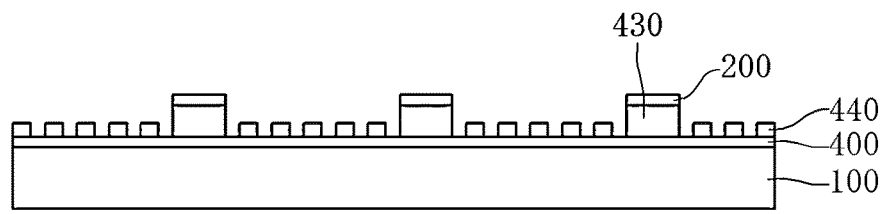
FIG. 15 is a sectional view taken along line B-B' of FIG. 13.

FIG. 15 is a sectional view showing the sensing electrode part of FIG. 13. Referring to FIG. 15, the wire electrode part of the wire electrode member includes the substrate 100, the resin layer 400 formed on the substrate 100, third and fourth patterns 430 and 440 formed on the resin layer 400, and the sensing electrode 200 formed on the third pattern 430.

The sensing electrode 200 is formed on the unactive area UA of the substrate 100. After forming the resin layer 400 on the unactive area UA, the third and fourth patterns 410 and 420 may be formed through an imprinting process. The resin layer 400 may include UV resin or thermo-setting resin.

A sensing electrode material may be coated on the third pattern 430 to form the sensing electrode 200.

The width of the third pattern 430 may be different from the width of the fourth pattern 440. In detail, the width of the third pattern 430 may be wider than the width of the fourth pattern 440. For example, the width of the third pattern 430 may be several μm, and the width of the fourth pattern 440 may be several nm.

The width and the height of the third pattern 430 may be formed at predetermined ratios with respect to the width and the height of the fourth pattern 440, respectively.

In detail, the ratio of the width of the third pattern 430 to the width of the fourth pattern 440 may be in the range of about 1:0.01 to about 1:0.5.

In addition, the ratio of the width of the third pattern 430 to the height of the fourth pattern 440 may be in the range of about 1:0.1 to about 1:1. Further, the ratio of the width of the third pattern 430 to the height of the fourth pattern 440 may be in the range of about 0.1:1 to about 1:1. In other words, as shown in FIG. 15, one sectional surface of the third pattern 430 may have a rectangular shape or a square shape.

In addition, the ratio of the height of the third pattern 430 to the height of the fourth pattern 440 may be in the range of about 1:0.1 to about 1:0.9.

Figure 16:
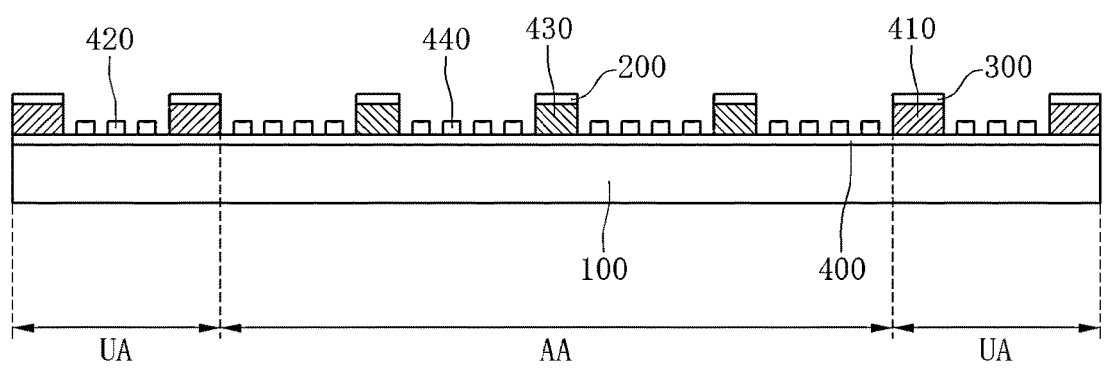
FIG. 16 is a sectional view showing the sensing electrode pattern and the wire electrode pattern of the touch pattern according to the embodiment.

FIG. 16 is a sectional view showing the sensing electrode part and the wire electrode part of FIG. 13. Referring to FIG. 16, the sensing electrode 200 is formed in the active area AA of the substrate 100, and the wire electrode 500 is formed in the unactive area UA of the substrate 100.

In detail, the first and second patterns 410 and 420 are formed in the unactive area UA, and the third and fourth patterns 430 and 440 are formed in the active area AA. The second pattern 420 is formed between the first patterns 410. In addition, the fourth pattern 440 is formed between the third patterns 430.

As described above, the width may be greater than that of the first pattern 410, and the width of the third pattern 430 may be much greater than that of the fourth pattern 440. In addition, the widths of the first and third patterns 410 and 430 may be several μm. The widths of the second and fourth patterns 420 and 440 may be several nm.

The second and fourth patterns 420 and 440 may be simultaneously formed. In addition, the second and fourth patterns 420 and 440 may have the same width.

An electrode material may be deposited on the first and third patterns 410 and 430. In detail, a wire electrode material 300' may be deposited on the first pattern 410, and a sensing electrode material 210 may be deposited on the third pattern 430. The wire electrode material and the sensing electrode material may include at least one selected from the group consisting of copper (Cu), aluminum (Al), nickel (Ni), tin (Sn), zinc (Zn), gold (Au), silver (Ag), and the alloy thereof. In detail, the wire electrode material and the sensing electrode material may include the same metal material.

In addition, in the electrode member according to the embodiment, a plurality of patterns are formed between the sensing electrode pattern and the wire electrode pattern while representing the width narrower than the width of the sensing electrode pattern or the wire electrode pattern. Therefore, after depositing the same electrode material on the sensing electrode pattern and the wire electrode pattern, an etching process is performed at a time, thereby simplifying the processes of forming the wire electrode and the sensing electrode.

According to the related art, after sequentially depositing the sensing electrode material and the wire electrode material on the substrate, the photoresist process, in detail, exposure, development, and etching processes are formed to form the wire electrode pattern area and the sensing electrode pattern area, respectively. Therefore, as the number of processes is increased, the process efficiency may be lowered.

Therefore, in the electrode member according to the embodiment, after forming the first to fourth patterns on the substrate through the imprinting process, the same electrode material is deposited on the first and third patterns and an etching process is performed with respect to the resultant structure at a time, so that the sensing electrode pattern and the wire electrode pattern can be formed.

Accordingly, in the electrode member according to the embodiment, a nano-pattern is formed even in a part in which the wire electrode is formed, thereby fabricating the sensing electrode pattern and the wire electrode pattern including the same electrode material.

Hereinafter, a method of fabricating the touch panel according to the embodiment will be described with reference to FIGS. 17 to 24. Although only the wire electrode is shown in FIGS. 17 to 24, a method of fabricating the sensing electrode is incorporated in the method of forming the wire electrode.

FIGS. 17 to 20 show the cases that an embossed mold is used, and FIGS. 21 to 24 show the cases that an intaglio mold is used.

Figure 17:
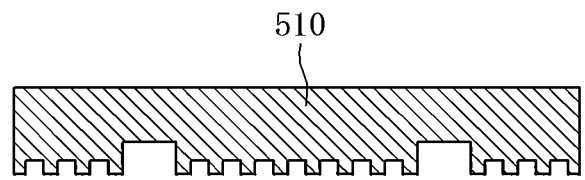
FIGS. 17 to 24 are sectional views showing a method of fabricating the electrode member according to the embodiment.
Figure 21:
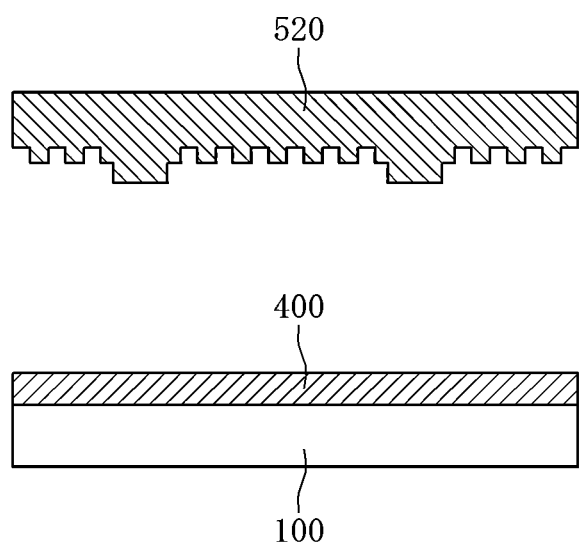

Referring to FIGS. 17 and 21, after forming the resin layer 400 on the substrate 100, an embossed mold 510 or an intaglio mold 520 is prepared.

Figure 18:
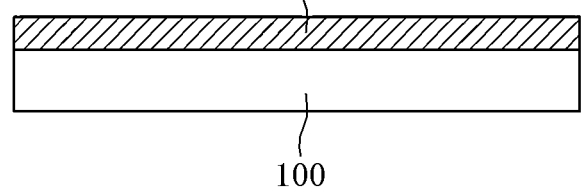
Figure 22:
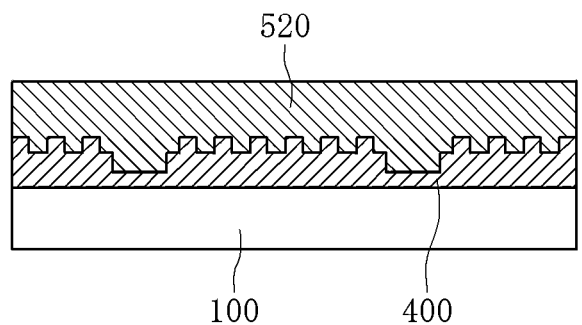

Thereafter, referring to FIGS. 18 and 22, the embossed mold 510 or the intaglio mold 520 may be used. In detail, after forming the resin layer 400, the resin layer 400 is imprinted by using the embossed mold 510 or the intaglio mold 520, so that the first and second patterns 410 and 420 may be formed.

In other words, when the first and second patterns 410 and 420 are formed in an intaglio shape, the first and second patterns 410 and 420 having the intaglio shape are formed on the resin layer 400 by using the embossed mold 510 corresponding to the intaglio shape. When the first and second patterns 410 and 420 are formed in an embossed shape, the first and second patterns 410 and 420 having the embossed shape may be formed on the resin layer 400 by using the intaglio mold 520 corresponding to the embossed shape. In this case, the resin layer 400 may include UV resin or thermosetting resin.

Figure 19:
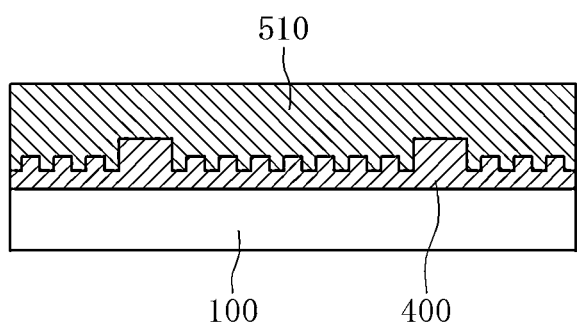
Figure 23:
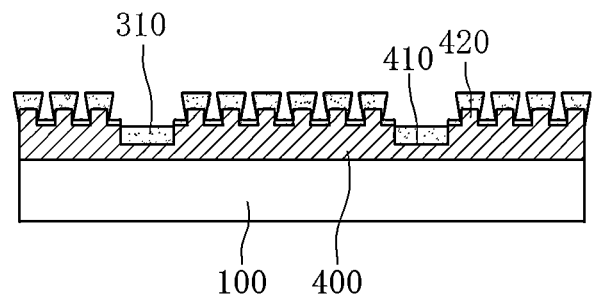

Thereafter, as shown in FIGS. 19 and 23, an electrode material 410 is coated on the top surface and/or the lateral side of the first pattern 410 and the second pattern 420 formed on the resin layer to deposit the electrode material 300'. The electrode material 300' may include at least one selected from the group consisting of copper (Cu), aluminum (Al), nickel (Ni), tin (Sn), zinc (Zn), gold (Au), silver (Ag), and the alloy thereof.

Figure 20:
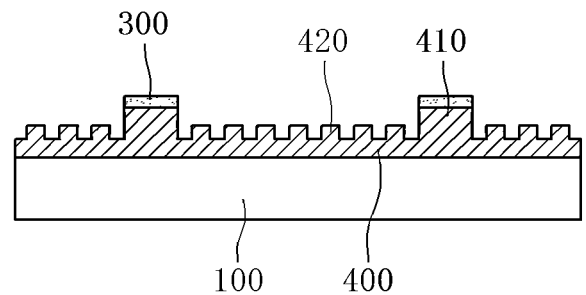
Figure 24:
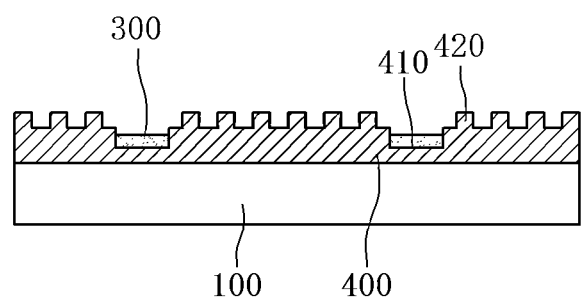

Subsequently, as shown in FIGS. 20 and 24, the electrode material formed on the resin layer is partially etched.

A difference is made in an etching rate depending on the structure of the first and second patterns 410 and 420 formed on the resin layer 400 and the contact area with the electrode material 300'. In other words, since the contact area between the first pattern 410 and the electrode material 300' is wider than the contact area between the second pattern 420 and the electrode material 300', the etching for the electrode material 300' formed on the first pattern 410 may be less performed. In other words, as the etching process is performed at the same etching rate, the electrode material 300' remains on the first sub-pattern 410, and the electrode material 300' is etched and removed from the upper portion of the second pattern 420. Therefore, referring to FIGS. 20 and 24, the wire electrode 500 may be formed only on the first pattern 410.

Figure 25:
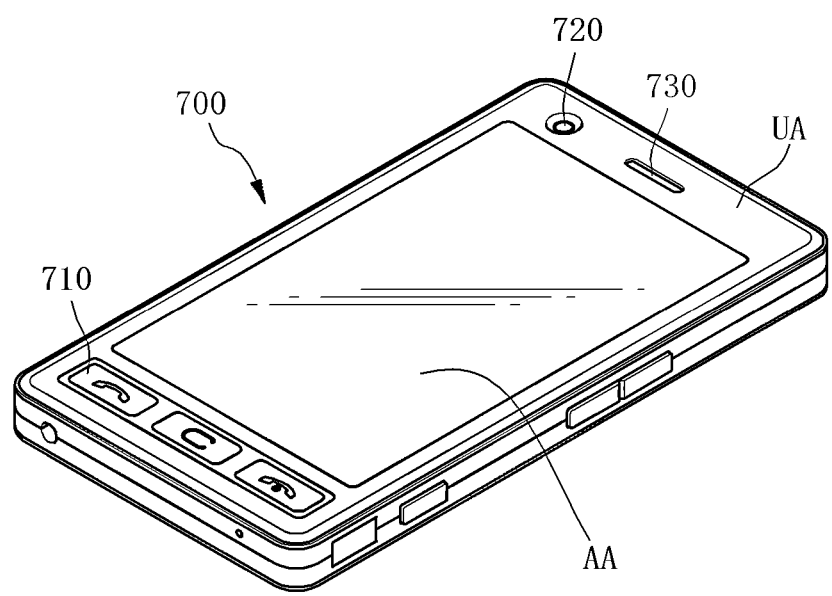
FIG. 25 is a perspective view showing a touch panel to which the electrode member according to the embodiment is applied.

The above-described electrode member according to the embodiment may be applied to a touch panel shown in FIG. 25. Although FIG. 25 shows the touch panel or a mobile terminal, the embodiment is not limited thereto, but the electrode member according to the embodiment may be applied to various display devices of home appliance, such as a lap-top computer, a TV, and a washing machine, and a vehicle.

Referring to FIG. 25, a touch panel 700 according to the embodiment may include a cover window including an active area AA and an unactive area UA, a command icon pattern part 710, a camera 720, and a speaker 720.

The touch panel according to the first embodiment may include the above-described electrode member. In detail, the touch panel according to the embodiment includes a cover window and an electrode member formed on the cover window. The electrode member includes a substrate including an active area and an unactive area, first and second patterns formed on the unactive area, and a first electrode formed on the first pattern. The width of the first pattern may be greater than the width of the second pattern.

In addition, the electrode member further includes third and fourth patterns formed on the active area, and a second electrode formed on the third pattern. The width of the third pattern may be wider than the width of the fourth pattern.

In this case, the first and second electrodes may include the same metal material.

The touch panel according to the second embodiment includes a cover window including an active area and an unactive area, a wire electrode pattern formed on the unactive area, and a sensing electrode pattern formed on the active area. The wire electrode pattern includes first and second patterns, the sensing electrode pattern includes third and fourth patterns, and the width of the first pattern may be greater than that of the second pattern. In other words, in the touch panel according to the embodiment, the sensing electrode pattern and the wire electrode pattern may be directly formed on the cover window.

In this case, the sensing electrode pattern and the wire electrode pattern may include the same metal material.

The touch panel according to the first and second embodiments may include an electrode member described above. Therefore, when forming the sensing electrode and the wire electrode, the process efficiency can be improved, and the fabricating cost can be reduced.

Any reference in this specification to "one embodiment," "an embodiment," "example embodiment," etc., means that a particular feature, structure, or characteristic described in connection with the embodiment is included in at least one embodiment of the invention. The appearances of such phrases in various places in the specification are not necessarily all referring to the same embodiment. Further, when a particular feature, structure, or characteristic is described in connection with any embodiment, it is submitted that it is within the purview of one skilled in the art to effect such feature, structure, or characteristic in connection with other ones of the embodiments.

Although embodiments have been described with reference to a number of illustrative embodiments thereof, it should be understood that numerous other modifications and embodiments can be devised by those skilled in the art that will fall within the spirit and scope of the principles of this disclosure. More particularly, various variations and modifications are possible in the component parts and/or arrangements of the subject combination arrangement within the scope of the disclosure, the drawings and the appended claims. In addition to variations and modifications in the component parts and/or arrangements, alternative uses will also be apparent to those skilled in the art.

What is claimed is:

1. A touch panel comprising:
    a substrate comprising an active area and an unactive area; and
    an electrode part on the active area of the substrate,
    wherein the electrode part comprises a first electrode and a second electrode,
    wherein the first electrode comprises a plurality of first sensor parts and a first connection electrode part to connect the first sensor parts with each other,
    wherein the first connection electrode part connects the first sensor parts with each other in a first direction,
    wherein the second electrode comprises a plurality of second sensor parts and a second connection electrode part to connect the second sensor parts with each other,
    wherein the second connection electrode part connects the second sensor parts with each other in a second direction crossing the first direction,
    wherein an insulating layer is interposed between the first connection electrode part and the second connection electrode part,
    wherein the electrode part is provided in a mesh shape,
    wherein the electrode part comprises a resin layer and an electrode material,
    wherein the resin layer is provided therein with a first sub-pattern and a second sub-pattern,
    wherein the electrode part includes a mesh opening part and a mesh line part,
    wherein the first sub-pattern is provided in the mesh line part,
    wherein the second sub-pattern is provided in the mesh opening part,
    wherein the second sub-pattern is provided between the first sub-pattern and an adjacent first sub-pattern,
    wherein the electrode material comprises a metal paste material,
    wherein the electrode material is disposed only on the first sub-pattern,
    wherein the first sub-pattern is formed integrally with the second sub-pattern,
    wherein a width of the first sub-pattern is wider than a width of the second sub-pattern,
    wherein the width of the first sub-pattern corresponds to a width of the electrode material, and
    wherein the width of the first sub-pattern is in a range of 500 nm to 3 µm.
2. The touch panel of claim 1, wherein a ratio of the width of the first sub-pattern to the width of the second sub-pattern is in a range of 1:0.01 to 1:0.5.
3. The touch panel of claim 1, wherein a ratio of the width of the first sub-pattern to a height of the first sub-pattern is in a range of 1:0.1 to 1:1.
4. The touch panel of claim 1, wherein a ratio of the width of the first sub-pattern to a height of the first sub-pattern is in a range of 0.1:1 to 1:1.
5. The touch panel of claim 1, wherein a ratio of a height of the first sub-pattern to a height of the second sub-pattern is in a range of 1:0.1 to 1:0.9.
6. The touch panel of claim 1, wherein the first and second sub-patterns have an embossed shape.
7. The touch panel of claim 1, wherein the first and second sub-patterns have an intaglio shape.
8. The touch panel of claim 1, wherein the electrode material comprises at least one selected from the group consisting of copper (Cu), aluminum (Al), nickel (Ni), tin (Sn), zinc (Zn), gold (Au), silver (Ag), and alloys thereof.
9. The touch panel of claim 1, wherein the width of the second sub-pattern is in a range of 100 nm to 500 nm.
10. An electrode member comprising:
    a substrate comprising an active area and an unactive area;
    a sensing electrode formed on the active area of the substrate;
    a wire electrode formed on the unactive area of the substrate; and
    a resin layer formed on the substrate;
    wherein the wire electrode is disposed on the resin layer,
    wherein the resin layer is provided therein with a first pattern and a second pattern,
    wherein the first pattern is formed integrally with the second pattern,
    wherein the wire electrode is provided in a mesh shape,
    wherein the wire electrode includes a mesh opening part and a mesh line part,
    wherein the first pattern is provided in the mesh line part,
    wherein the second pattern is provided in the mesh opening part,
    wherein the second pattern is provided between the first pattern and an adjacent first pattern,
    wherein the wire electrode is disposed only on the first pattern,
    wherein the wire electrode comprises a metal paste material,
    wherein a width of the first pattern is wider than a width of the second pattern,
    wherein the width of the first pattern corresponds to a width of the wire electrode,
    wherein the sensing electrode is disposed on the resin layer,
    wherein the resin layer is provided therein with a third pattern and a fourth pattern,
    wherein the third pattern is formed integrally with the fourth pattern,
    wherein the sensing electrode is provided in a mesh shape,
    wherein the sensing electrode includes a mesh opening part and a mesh line part,
    wherein the third pattern is provided in the mesh line part,
    wherein the fourth pattern is provided in the mesh opening part,
    wherein the fourth pattern is provided between the third pattern and an adjacent third pattern,
    wherein the sensing electrode is disposed only on the third pattern,
    wherein a width of the third pattern is wider than a width of the fourth pattern, wherein the width of the third pattern corresponds to a width of the sensing electrode, and wherein the width of the third pattern is in a range of 500 nm to 3 μm.

11. The electrode member of claim 10, wherein the sensing electrode and wire electrode comprise a same metal material.

12. A touch panel comprising:
a cover window; and
an electrode member on the cover window,
wherein the electrode member comprises:
a substrate comprising an active area and an unactive area;
a sensing electrode formed on the active area of the substrate;
a wire electrode formed on the unactive area of the substrate; and
a resin layer formed on the substrate;
wherein the wire electrode is disposed on the resin layer,
wherein the resin layer is provided therein with a first pattern and a second pattern,
wherein the first pattern is formed integrally with the second pattern,
wherein the wire electrode is provided in a mesh shape,
wherein the wire electrode includes a mesh opening part and a mesh line part,
wherein the first pattern is provided in the mesh line part,
wherein the second pattern is provided in the mesh opening part,
wherein the second pattern is provided between the first pattern and an adjacent first pattern,
wherein the wire electrode is disposed only on the first pattern,
wherein the wire electrode comprises a metal paste material,
wherein a width of the first pattern is wider than a width of the second pattern,
wherein the width of the first pattern corresponds to a width of the wire electrode,
wherein the sensing electrode is disposed on the resin layer,
wherein the resin layer is provided therein with a third pattern and a fourth pattern,
wherein the third pattern is formed integrally with the fourth pattern,
wherein the sensing electrode is provided in a mesh shape,
wherein the sensing electrode includes a mesh opening part and a mesh line part,
wherein the third pattern is provided in the mesh line part,
wherein the fourth pattern is provided in the mesh opening part,
wherein the fourth pattern is provided between the third pattern and an adjacent third pattern,
wherein the sensing electrode is disposed only on the third pattern,
wherein a width of the third pattern is wider than a width of the fourth pattern,
wherein the width of the third pattern corresponds to a width of the sensing electrode, and
wherein the width of the third pattern is in a range of 500 nm to 3 μm.

13. The touch panel of claim 12,
wherein the sensing electrode and wire electrode comprise a same metal material.

14. The electrode member of claim 10, wherein a ratio of the width of the first pattern to the width of the second pattern is in a range of 1:0.01 to 1:0.5, and
wherein a ratio of the width of the third pattern to the width of the fourth pattern is in a range of 1:0.01 to 1:0.5.

15. The electrode member of claim 10, wherein a ratio of the width of the first pattern to a height of the first pattern is in a range of 1:0.1 to 1:1, and
wherein a ratio of the width of the third pattern to a height of the fourth pattern is in a range of 1:0.1 to 1:1.

16. The electrode member of claim 10, wherein a ratio of the width of the first pattern to a height of the first pattern is in a range of 0.1:1 to 1:1, and
wherein a ratio of the width of the third pattern to a height of the fourth pattern is in a range of 0.1:1 to 1:1.

17. The electrode member of claim 10, wherein a ratio of a height of the first pattern to a height of the second pattern is in a range of 1:0.1 to 1:0.9, and
wherein a ratio of a height of the third pattern to a height of the fourth pattern is in a range of 1:0.1 to 1:0.9.

18. The electrode member of claim 10, wherein the first and second patterns have an embossed shape, and
wherein the third and fourth patterns have the embossed shape.

19. The electrode member of claim 10, wherein the first and second patterns have an intaglio shape, and
wherein the third and fourth patterns have the intaglio shape.

20. The electrode member of claim 10, wherein the sensing and wire electrode comprise at least one selected from the group consisting of copper (Cu), aluminum (Al), nickel (Ni), tin (Sn), zinc (Zn), gold (Au), silver (Ag), and alloys thereof.

* * * * *